April 10, 1951
L. STEIN
2,548,244
STEERING COLUMN
Filed Aug. 25, 1949
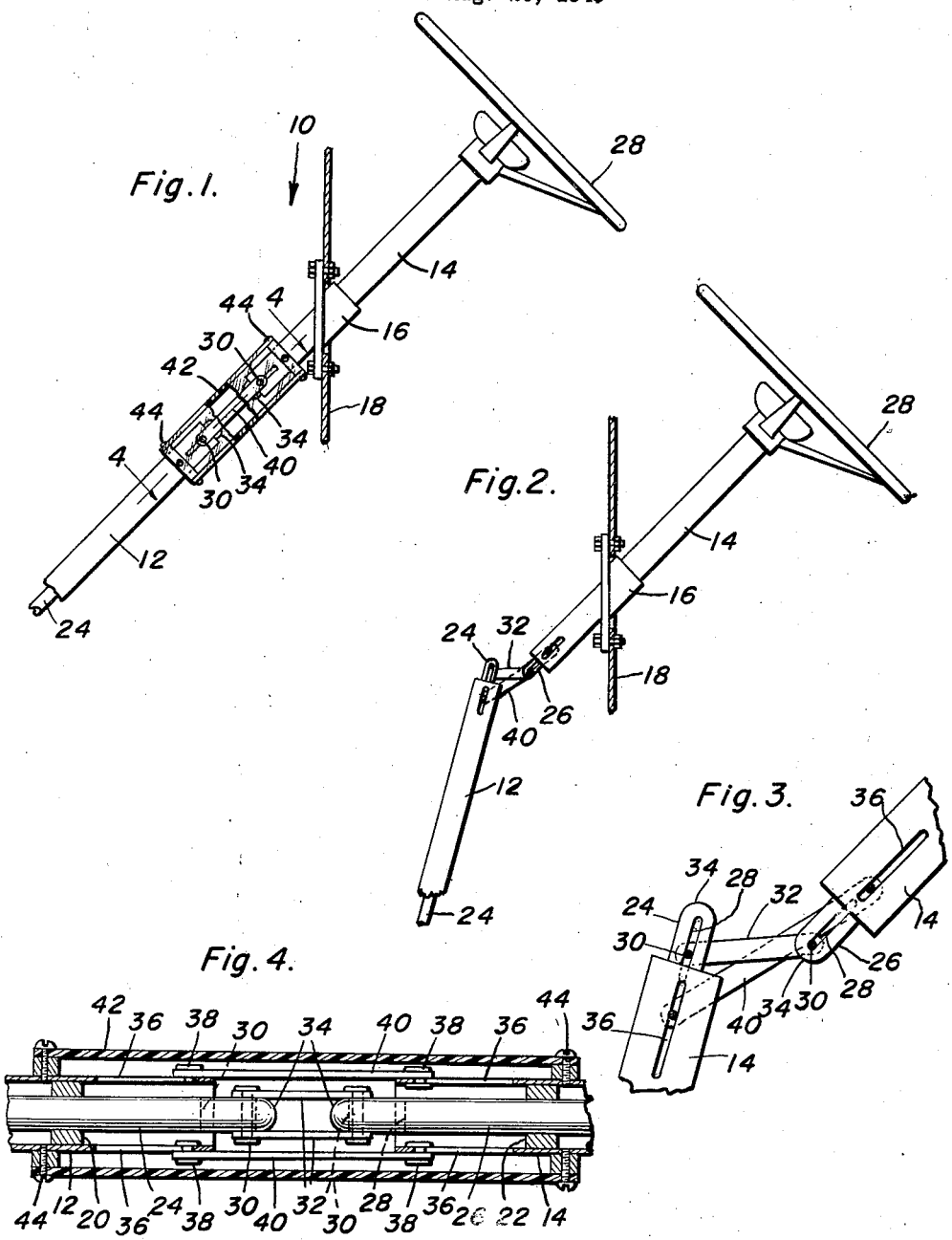
Louis Stein
INVENTOR.

Patented Apr. 10, 1951

2,548,244

UNITED STATES PATENT OFFICE 2,548,244

STEERING COLUMN

Louis Stein, Bronx, N. Y.

Application August 25, 1949, Serial No. 112,340

2 Claims. (Cl. 74—492)

This invention relates to new and useful improvements and structural refinements in steering columns for vehicles such as automobiles, etc., and the principal object of the invention is to substantially minimize if not completely eliminate injury to the driver caused by rearward shifting of the steering column upon impact in collision.

This object is achieved by the provision of the instant device wherein the steering column is composed of a plurality of sections which are normally in longitudinal alignment, but which are operatively connected together in such manner that the steering column will "buckle" in the event of impact, rather than being thrust rearwardly.

Some of the advantages of the invention reside in its simplicity of construction, in the safety of its operation, and in its adaptability to economical manufacture.

Another advantage of the invention resides in its ability to absorb road shock, without transmitting the same to the steering wheel.

With the above more important objects and features in view and such other objects and features that may become apparent as this specification proceeds, the invention consists essentially of the arrangement and construction of parts as illustrated in the accompanying drawings, in which:

Figure 1 is a side elevational view of the invention in its normal position, this being partially broken away so as to reveal the construction;

Figure 2 is a side elevational view, similar to that shown in Figure 1, but illustrating the invention in its "buckled" or collapsed position;

Figure 3 is a fragmentary side elevational detail on an enlarged scale, showing a portion of the subject illustrated in Figure 2; and Figure 4 is a fragmentary cross sectional view, taken substantially on the plane of the line 4—4 in Figure 1.

Like characters of reference are employed to designate like parts in the specification and throughout the several views.

Referring now to the accompanying drawings in detail, the general reference character 10 designates a steering column consisting of a pair of tubular housing sections 12, 14, the latter of which is supported by a suitable sleeve or bracket 16 in a fire wall or bulkhead 18 of the vehicle, while the housing section 12 is secured to the usual steering box (not shown) in a conventional manner.

The housing sections 12, 14 are provided with suitable bearings or bushings 20, 22 to rotatably accommodate respective sections 24, 26 of the steering shaft proper, the shaft section 26 being provided with the usual steering wheel 28, as shown.

The housing sections 12, 14 and the shaft sections 24, 26, are, respectively, in longitudinal alignment under normal driving conditions (see Figure 1), and the adjacent ends of the shaft and housing sections are spaced, as is best shown in Figure 4. The operative connection between the respective shaft and housing sections involves the provision of a pair of slots 28 in the adjacent end portions of the shaft sections 24, 26, these slots being adapted to slidably receive transverse pivot pins 30, extending through end portions of a pair of links 32 which are disposed at diametrically opposite sides of the shaft sections and thereby operatively connect the shaft sections together so that rotation of one is imparted to the other.

It is to be also noted that adjacent ends of the shaft sections 24, 26, terminate in convexed extremities 34 which are adapted to oppose one another when the pins 30 slide in opposite directions from each other in the slots 28, as will be hereinafter described.

The connection of the housing sections 12, 14, is similar to the connection of the shaft sections, inasmuch as the housing sections are provided in the adjacent end portions thereof with pairs of diametrically opposed, longitudinally extending slots 36, to slidably receive pivot elements or rivets 38 whereby a pair of links 40 are pivotally attached to diametrically opposite sides of the housing sections 12, 14 for the purpose of connecting the same together.

In addition, a flexible sleeve 42 may be secured to the housing sections 12, 14, as at 44 for the purpose of protectively enclosing the links 32, 40, and if desired the sleeve 42 may be formed from transparent material so that the links may be visually inspected for proper alignment without the necessity of disassembling the structure.

When the invention is placed in use, the shaft and housing sections are longitudinally aligned as has been already explained, but in the event of an impact resulting from collision, such as would otherwise thrust the entire steering column rearwardly and possibly cause injury to the operator of the vehicle, the shaft section 24 and the housing section 12 will slide upwardly until the extremity 34 of the shaft section 24 abuts the corresponding extremity of the shaft section 26, whereupon the shaft sections as well as the housing sections will assume a "buckled" angular relationship illustrated in Figure 2, without any rearward or upward thrust being imparted to the shaft sections 26 and housing section 14, as will be clearly apparent.

It is to be noted that while the links 32 and the links 40 facilitate simultaneous "collapsing" of the shaft and housing in a common plane, the housing is of a sufficient diameter to permit only the links 32 to buckle when they are offset from the links 40 upon rotation of the shaft in the housing, or alternatively, the housing may buckle to some extent while the shaft remains straight.

It is believed that the advantages and use of the invention will be readily understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a steering column, the combination of a pair of shaft sections normally disposed in axial alignment and provided in adjacent end portions thereof with longitudinally extending slots, transverse pivot pins slidable in said slots, and a link having each end thereof mounted on one of said pins, whereby the shaft sections are operatively connected together and whereby they may assume angularly offset positions, the adjacent ends of said shaft sections having convex extremities adapted to abut each other.

2. In a steering column, the combination of a pair of tubular housing sections normally disposed in axial alignment, a pair of shaft sections each rotatably journalled in one of said housing sections, a pair of links pivoted to diametrically opposite sides of the adjacent end portions of said housing sections, an additional link pivoted to adjacent end portions of said shaft sections, whereby said sections may assume angularly offset positions, adjacent ends of said shaft sections having convex extremities adapted to abut each other preparatory to angular offsetting of the sections, and a flexible sleeve having opposite ends thereof secured to adjacent end portions of said housing sections and covering said links.

LOUIS STEIN.

REFERENCES CITED

The following references are of record in the file of this patent:

UNITED STATES PATENTS

| Number | Name | Date |
|---|---|---|
| 2,088,146 | Walker | July 27, 1937 |
| 2,436,336 | Slater | Feb. 17, 1946 |
| 2,477,827 | Robinson | Aug. 2, 1949 |

FOREIGN PATENTS

| Number | Country | Date |
|---|---|---|
| 535,499 | Great Britain | Apr. 10, 1941 |